United States Patent [19]
Neubert et al.

[11] Patent Number: 5,398,414
[45] Date of Patent: Mar. 21, 1995

[54] ELECTRICAL HAND SAW

[75] Inventors: Werner Neubert; Joachim Schadow; Joachim Mueller, all of Stuttgart; Manfred-Otto Staebler, Waldenbuch; Manfred Dohr, Esslingen; Herbert Faerber, Stuttgart; Heinz Warkentin, Allmersbach Im Tal, all of Germany

[73] Assignee: Robert Bosch GmbH, Stuttgart, Germany

[21] Appl. No.: 179,367

[22] Filed: Jan. 10, 1994

[30] Foreign Application Priority Data

Jan. 30, 1993 [DE] Germany .............. 43 02 674.5

[51] Int. Cl.6 ............................................ B23Q 11/00
[52] U.S. Cl. ............................................ 30/124; 30/392; 173/198
[58] Field of Search .................. 30/392, 516, 501, 124, 30/369; 173/198, 199

[56] References Cited

U.S. PATENT DOCUMENTS

| 4,192,390 | 3/1980 | Wanner et al. | 173/198 |
| 4,665,617 | 5/1987 | Maier et al. | 30/392 |
| 5,012,583 | 5/1991 | Blochle et al. | 30/124 |
| 5,031,324 | 7/1991 | Berghauser et al. | 30/392 |

FOREIGN PATENT DOCUMENTS

| 3820752 | 12/1989 | Germany | 30/392 |
| 8002602 | 11/1980 | Netherlands | 173/198 |

Primary Examiner—Eugenia Jones
Assistant Examiner—Allan M. Schrock
Attorney, Agent, or Firm—Michael J. Striker

[57] ABSTRACT

An electric hand saw has a stationary sword having a lower side, a reciprocatable saw blade received in the lower side of the sword and having a rear end portion, a machine housing having a transmission outlet in which the rear end portion of the saw blade is received. The machine housing has a longitudinal slot located under the rear end portion of the saw blade. A suction passage is mounted on the lower side of the machine housing and has a sucking-in opening extending from the front end side of the suction passage to the longitudinal slot of the machine housing located under the rear end portion of the saw blade.

7 Claims, 1 Drawing Sheet

U.S. Patent     Mar. 21, 1995     5,398,414
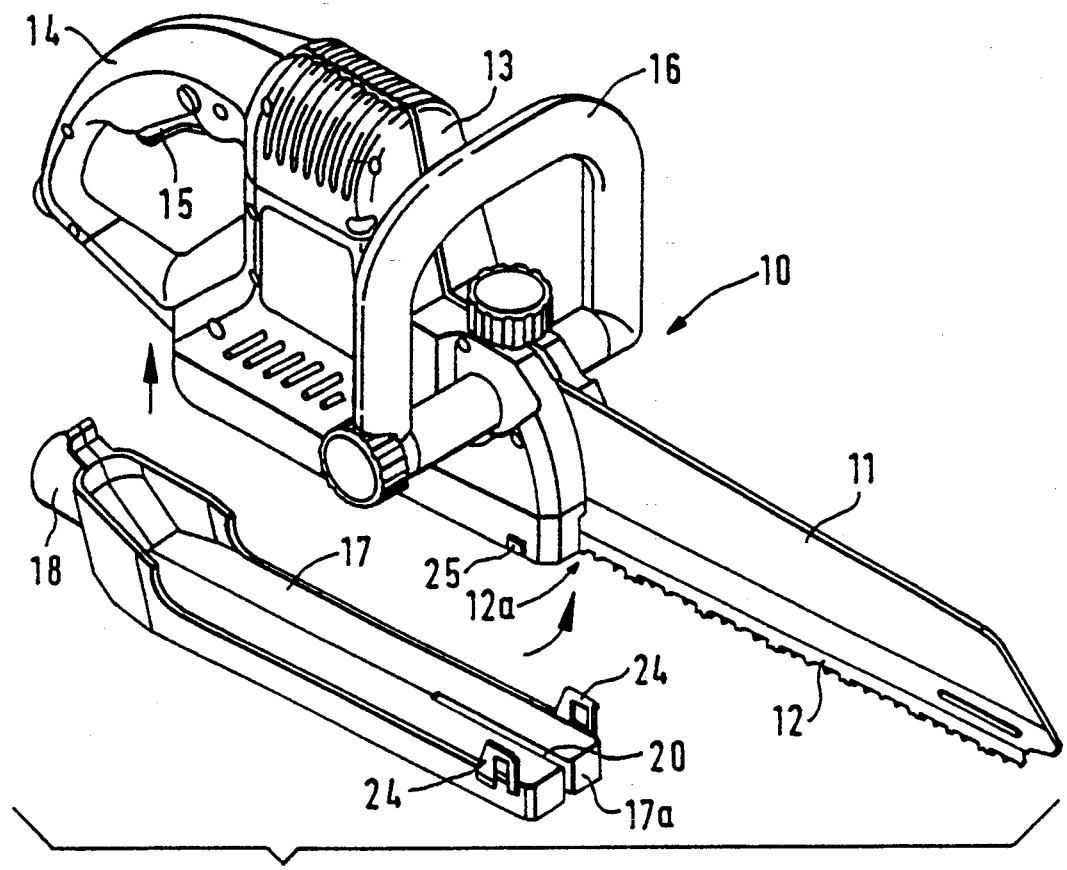
Fig. 1
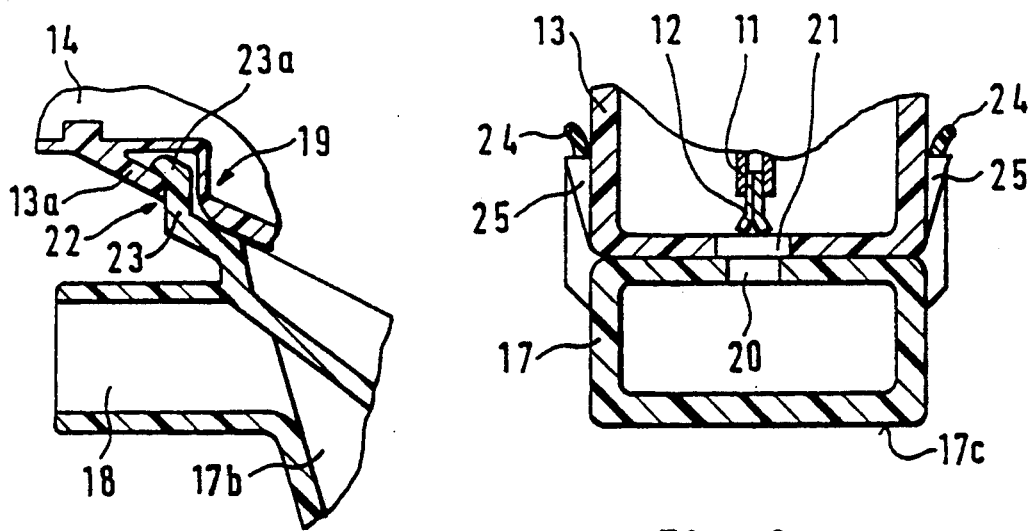
Fig. 2
Fig. 3

5,398,414

ELECTRICAL HAND SAW

BACKGROUND OF THE INVENTION

The present invention relates to an electrical hand saw, in particular a sword saw. More particularly, it relates to an electrical hand saw with a saw blade received in a lower side of a stationary sword and having a rear end portion received in a machine housing at the transmission outlet.

Electrical hand saws of the above mentioned generally type are known in the art. During sawing operation with such hand tools it is known that, depending on the material to be sawed, saw chips or saw particles and dust are transported through the saw blade from the saw slot to the machine. These particles therefore act on a person operating the tool and also contaminate the environment.

SUMMARY OF THE INVENTION

Accordingly, it is an object of the present invention to provide an electrical hand saw which avoids the disadvantages of the prior art.

In keeping with this object, and with others which will become apparent hereinafter, one feature of the patent invention resides, briefly stated, in an electrical hand saw in which a suction passage is provided on the lower side of the machine housing and its suction opening extends from the front end side of the suction passage to under a longitudinal slot of the machine housing formed under the rear end portion of the saw blade.

When the electrical hand saw is designed in accordance with the present invention, the dust as well as saw particles produced during the operation of the saw in the region of the front side of the machine can be transported through a hose of a suction aggregate connected with a suction pipe of the suction passage. It is further advantageous that the saw particles transported from the saw blade from the machine housing are aspirated through the correspondingly arranged sucking-in opening of the suction passage and therefore cannot be so applied to the transmission of the machine.

In accordance with the another feature of the present invention, the sucking-in opening of the suction passage is formed as a longitudinal slot under the rear end portion of the saw blade.

Still another feature of the present invention is that the suction passage is formed on the lower side of the machine housing with a suction pipe extending on its rear side parallel to the longitudinal axis of the tool and formed as a separate removable part. It can be turnably suspended with a hinge in the region of the suction pipe by a suspending device and engagable in the front region with arresting means on the machine housing.

The suspending device can be formed as an upwardly projecting tongue provided on the rear side of the suction passage and having an angled tongue end engaging in a transverse slot formed at the lower side of the handle of the machine housing.

U-shaped arresting brackets can be provided in the front region of the suction passage at both sides so as to be displaced by arresting projections formed at both sides in the front part of the machine housing.

The suction passage can be elongated and can have a rectangular cross section with a rear portion inclined upwardly in the suction pipe. The lower side of the suction passage can be formed as a flat standing surface.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a perspective view of a sword saw in accordance with the present invention with a removed suction passage;

FIG. 2 is a view showing a lower part of the machine housing with a suspended tongue on the rear side of the suction passage, in a cross section;

FIG. 3 is a view showing a front region of the machine housing with a two-sided arresting of the suction passage, in a cross section.

DESCRIPTION OF PREFERRED EMBODIMENTS

FIG. 1 shows an electrical hand saw formed as a hand-guided electrically operating sword saw as identified with reference number 10. The saw has a stationary sword 11 and two saw blades 12 which are located near one another and received in the lower side of the sword. The saw blades 12 are reciprocatably displacable by an electric drive of the sword saw. The rear end portion 12A of the saw blades 12 is received in a multi-part machine housing 13 which surrounds a transmission and an electric motor, and in particular at the not shown transmission outlet. The housing 13 in the rear part of the sword saw 10 is formed as a handle 14 with a switching element 15 for turning on and turning off the machine. In the front region an additional handle 16 is formed as a gripping bracket by a tubular portion extending transversely to the sword 11 and received in the housing 13.

A suction passage 17 is arranged on the lower side of the machine housing 13. It is formed as a separate removable part as shown in FIG. 1. The suction passage is mounted from below in direction of the arrow 17 flush on the lower side of the saw sword 10 and the handle 14. The suction passage 17 is provided at its rear side with a suction pipe 18 which extends parallel to the imaginary longitudinal axis of the tool. For bringing the suction passage 17 on the machine housing 13, first a suspending device 19 arranged in the region of the suction pipe 18 is suspended hingedly and turnably on the rear side of the handle as shown in a cross section in FIG. 2. Then in the front region, the suction passage 17 is clamped with arresting means on machine housing 13 as shown in FIG. 3. The sucking-in opening 20 of the suction passage 17 extends from the front end side 17A of the suction passage 17 to under a longitudinal slot 21 in the machine housing 13 located under the end portion 12A of the saw blade 12. As can be seen from FIG. 1, the sucking-in opening 20 of the suction passage 17 is formed as a longitudinal slot which in mounted condition is located under the longitudinal slot 21 of the machine housing 13 and thereby under the rear end portion 12A of the saw blade in FIG. 3.

As can be seen from FIG. 2, the suspending device 19 of the suction passage 17 has a tongue 23 extending upwardly on the rear side of the suction passage 17 and having an angled tongue end 23A. The tongue end is suspended in a transverse slot 23 formed on the lower side of the handle 14 of the machine housing 13 in the housing wall 13A. In the shown position of the suction passage 17 in which it is turned upwardly, the tongue end 23A abuts against the housing wall 13A. It is therefore guaranteed that the dust aspirating hose fitted on the suction passage 17 cannot slide rearwardly from the saw 10 by the pulling forces of the suction passage 17. In the front region of the suction passage 17, the U-shaped arresting brackets 24 are formed at both sides. Both arresting brackets 24 cooperate with arresting projections 25 which are formed forwardly on the machine housing 13, also on both sides. In particular, the suspended suction passage 17 is turned forwardly so that the arresting brackets 24 are lifted by the rear side of the arresting projections 25 and finally engage the arresting projections. The suction passage 17 has an elongated shape which corresponds to the profile of the lower side of the machine housing 13 and has a rectangular cross section. The rear portion 17B of the suction passage 17 is inclined upwardly in the suction pipe 18. For placing the sword saw 10 in a standing position the lower side 17C of the suction 17 is formed as a flat standing surface.

It will be understood that each of the elements described above, or two or more together, may also find a useful application in other types of constructions differing from the types described above.

While the invention has been illustrated and described as embodied in an electric hand saw, in particular a hand-guided electrically driven sword saw, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A power-operated hand sword saw, comprising a stationary sword having a lower side; a reciprocatable saw blade received in said lower side of said sword and having a rear end portion; a machine housing having a transmission outlet in which said rear end portion of said saw blade is received so that said saw blade extends forwardly from said machine housing, said machine housing having a first longitudinal slot substantially parallel to and located under said rear end portion of said saw blade; and a suction passage releasably mounted on said machine housing flush with a lower side of said machine housing and formed as a closed passage interrupted by a suction pipe opening and a sucking-an opening, said sucking-in opening being formed as a second longitudinal slot extending through a front end side of said suction passage and through an upper side of said suction passage, said first longitudinal slot opposing said second longitudinal slot of said machine housing located under said rear end portion of said saw blade.

2. A power-operated hand sword saw as defined in claim 1, wherein said suction passage is formed as a separate removable part, said part being hingedly suspended adjacent of said suction pipe opening on said machine housing and being arrestable relative to a front region of said machine housing.

3. A power-operated hand sword say as defined in claim 2; further comprising a suspending device with which said suction passage is suspended opposite the machine housing adjacent said suction pipe opening; and arresting means with which said suction passage is arrestable in said front region of said machine housing.

4. A power-operated hand sword saw as defined in claim 3, wherein said suspending device includes a tongue extending upwardly from said suction passage and having an angular tongue end, said machine housing having a handle with a lower side provided with a transverse slot so that said tongue end engages in said transverse slot.

5. A power-operated hand sword saw as defined in claim 3, wherein said arresting means includes U-shaped arresting brackets extending upwardly in a front region of said suction passage, and arresting projections formed on said machine housing at front region so that said arresting brackets are displacable over said arresting projections.

6. A power-operated hand sword saw as defined in claim 2, wherein said suction passage has an elongated shape with a rectangular cross section and a rear portion extending upwardly to said suction pipe opening.

7. A power-operated hand sword saw as defined in claim 1, wherein said suction passage has a lower side formed as a flat standing surface.

* * * * *